United States Patent
Kitagawa

(10) Patent No.: US 8,148,939 B2
(45) Date of Patent: Apr. 3, 2012

(54) BATTERY PACK USING A SECONDARY BATTERY AND CONNECTION SYSTEM FOR CONNECTING THE BATTERY PACK TO A CHARGING DEVICE OR A LOADING DEVICE

(75) Inventor: Katsunori Kitagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 853 days.

(21) Appl. No.: 11/918,920

(22) PCT Filed: Apr. 11, 2006

(86) PCT No.: PCT/JP2006/307619
§ 371 (c)(1),
(2), (4) Date: Oct. 2, 2008

(87) PCT Pub. No.: WO2006/115037
PCT Pub. Date: Nov. 2, 2006

(65) Prior Publication Data
US 2009/0039833 A1   Feb. 12, 2009

(30) Foreign Application Priority Data

Apr. 22, 2005   (JP) ................................ 2005-124628

(51) Int. Cl.
*H02J 7/00*   (2006.01)
(52) U.S. Cl. ....................................................... 320/112
(58) Field of Classification Search .................... 320/112
See application file for complete search history.

(56) References Cited

U.S. PATENT DOCUMENTS

| | | | | |
|---|---|---|---|---|
| 5,572,110 A | * | 11/1996 | Dunstan | 320/106 |
| 5,714,868 A | | 2/1998 | Uchida et al. | |
| 5,760,587 A | * | 6/1998 | Harvey | 324/434 |
| 5,990,659 A | * | 11/1999 | Frannhagen | 320/106 |

FOREIGN PATENT DOCUMENTS

| | | |
|---|---|---|
| JP | 05-135804 | 6/1993 |
| JP | 06-153409 | 5/1994 |
| JP | 08-329992 | 12/1996 |
| JP | 11-041828 | 2/1999 |
| JP | 2004-031285 | 1/2004 |
| JP | 2004-349104 | 12/2004 |
| JP | 2005-130584 | 5/2005 |

* cited by examiner

*Primary Examiner* — Arun Williams
(74) *Attorney, Agent, or Firm* — McDermott Will & Emery LLP

(57) ABSTRACT

In a battery pack (1), control means (3) reads identification information or operating state detection information out of identification information memory means (4) or battery operating state detection means (10) and inputs it to a modulation circuit (5). The modulation circuit (5) modulates the information into an information signal which can be superimposed on a direct-current power transmission line and sends it to a charging device (20) or a loading device (30) through a positive charge and discharge terminal (11). The charging device (20) or the loading device (30) demodulates the sent information signal to take out the identification information or the operating state detection information and allows power source control means (25, 35) to control the output of charging energy from a charging power source (23) or the output of discharging energy to a load (33). Thus, in addition to the transmission of direct-current power, information can be transmitted only by the connection of two positive and negative terminals.

13 Claims, 8 Drawing Sheets

BATTERY PACK USING A SECONDARY BATTERY AND CONNECTION SYSTEM FOR CONNECTING THE BATTERY PACK TO A CHARGING DEVICE OR A LOADING DEVICE

RELATED APPLICATIONS

This application is the U.S. National Phase under 35 U.S.C. §371 of International Application No. PCT/JP2006/307619, filed on Apr. 11, 2006, which in turn claims the benefit of Japanese Application No. 2005-124628, filed on Apr. 22, 2005, the disclosures of which Applications are incorporated by reference herein.

TECHNICAL FIELD

The present invention relates to a battery pack using a secondary battery and a connection system for connecting the battery pack to a charging device or a loading device. The charging device is defined as a device which is connected to a battery pack to supply charging energy to a secondary battery. The loading device is defined as a device which is connected to a battery pack to be operated by the discharging energy of a secondary battery.

BACKGROUND ART

A battery pack using a secondary battery is widely used as a power source of portable electronic equipment such as a cellular phone, a notebook personal computer (hereinafter called a notebook PC), and a PDA. The battery pack is appropriately provided with a function of protecting a secondary battery from over-charge, over-discharge, a short circuit, and the like, a function of calculating and displaying the amount of remaining capacity, a function of communicating with a charging device and a loading device, a function of detecting compatibility with a connected device or an imitation, and the like in accordance with a demand of the charging device or the loading device to which the battery pack is connected.

For example, as shown in FIG. 7, a battery pack 100 for a cellular phone is provided with a secondary battery 101, a battery protection IC 102 and a protection element 105 for protecting the secondary battery 101 from over-discharge, over-charge, over-current, and the like, a PTC element 103 for preventing a short circuit current, a thermistor 104 for detecting the temperature of the charged battery, and the like. The battery pack 100 connected to a charging device through connection terminals 106, 107, and 108 is charged while the thermistor 104 monitors the battery temperature. The battery pack 100 connected to a loading device (being a cellular phone) through the connection terminals 106 and 107 discharges battery energy to the loading device. A battery pack for a notebook PC adopts a smart battery system pursuant to a system management bus standard by which the battery pack and a PC body are connected to each other with a bidirectional two-wire bus or the like for allowing the notebook PC to manage a power source.

To prevent the failure or accident of the battery pack caused by connecting the battery pack to an incompatible charging device, to prevent a failure or an accident due to the use of an imitation battery pack, and the like, a battery pack is known which is provided with ID memory means on which identification information for identifying a connectable battery pack is stored. FIG. 8 shows the conventional structure of a battery pack and a connection system thereof in which a battery pack 200 is provided with an ID circuit section 207 and a connection device (being a loading device or charging device) 300 to which the battery pack 200 is connected is provided with an ID detection section 307 in order to prevent an imitation battery pack from being connected to a loading device and prevent the battery pack from being connected to a charging device except for a compatible exclusive charger.

In FIG. 8, the battery pack 200 is provided with a secondary battery 201, temperature detection means 202, voltage detection means 203, current detection means 204 for detecting each of a temperature, a voltage, a charging and discharging current of the secondary battery 201, a control circuit 206 which turns on and off a protection element 205 for control by detecting the state of over-charge, over-discharge, and over-current of the secondary battery 201 by detection information from each detection means, and the ID circuit section 207 on which identification information is stored. The positive electrode and negative electrode of the secondary battery 201 are connected to a positive charge and discharge terminal 208 and a negative charge and discharge terminal 209, respectively, and the ID circuit section 207 is connected to an ID terminal 210. The connection device 300, which refers to the charging device here, is provided with a charging power source 301, the ID detection section 307 for reading the identification information out of the ID circuit section 207, and a condition selection section 306 which judges the compatibility of the battery pack 200 from the identification information which is read out and controls the output of charging energy from the charging power source 301.

When not only the foregoing battery packs 100 and 200 but also any battery pack is connected to a charging device or a loading device, it is indispensable to connect an information transmission line for transmitting control information, ID information, and the like in addition to a direct-current power transmission line for the positive and negative electrodes. In other words, since a signal transmission line exists except for the two line connections essentially required for transmitting the direct-current power, three or more connection terminals are required for connecting the battery pack to the connection device. The more the numbers of the connection terminals increases, the more the connection terminals are susceptible to electromagnetic interference (EMI) and electrostatic destruction. Accordingly, there is the fear of influence such as degradation in function, a malfunction, the disappearance of stored information, and the like. Also, the device is difficult to miniaturize due to upsizing of the connection terminals and costs tend to increase due to the number of man-hours required for wiring.

Accordingly, it is preferable to reduce the number of connection terminals, and the structure of only two connection terminals for connecting the direct-current power transmission line which is essentially required is ideal. As a conventional technology for realizing this structure, in order to connect a battery pack to a charging device, a structure is known in which information is transmitted via an electromagnetic connection or an optical connection and there are only two positive and negative charge and discharge terminals for transmitting direct-current power as the connection terminals (see, for example, Patent Document 1).

[Patent document 1] Japanese Patent Laid-Open Publication No. 05-135804

DISCLOSURE OF THE INVENTION

Problems to be Solved by the Invention

In the foregoing conventional technology, the mechanically connected connection terminals are the only two positive and negative charge and discharge terminals. However, it is necessary to open a window in the corresponding position of each of the battery pack and the connection device for electromagnetic coupling or optical coupling in order to establish the electromagnetic or optical connection and hence there is a problem that the terminal connection cannot be easily structured. Components for the electromagnetic or optical connection require that the battery pack and the charging device or the loading device are oppositely disposed in close positions with predetermined precision, and there was a problem that this technology was available only when the battery pack and the charging device or the loading device could be closely disposed. Furthermore, the positions of the components installed in the battery pack and the charging device or the loading device for information transmission are limited and layout space becomes large. Thus, it was difficult to apply the technology to small equipment such as portable electronic equipment.

In view of the foregoing problems, an object of the present invention is to provide a battery pack and a connection system thereof which can carry out the information transmission between the battery pack and a charging device or a loading device using a direct-current power transmission line and are connected with only two connection terminals for the direct-current power transmission line.

Means for Solving the Problems

In a first invention of the present application to achieve the foregoing object, a battery pack includes a secondary battery and a positive charging and discharging terminal and a negative charge and discharge terminal which are connected to a positive electrode and a negative electrode of the secondary battery, respectively. The battery pack is provided with identification information memory means and information signal sending means. The identification information memory means stores identification information. The information signal sending means modulates the identification information read out of the identification information memory means into an identification signal, which can be transmitted to a charging device for supplying charging energy to the secondary battery by connecting it to the positive charge and discharge terminal and the negative charge and discharge terminal or a loading device which is operated by the discharging energy of the secondary battery by connecting it to the positive charge and discharge terminal and the negative charge and discharge terminal through the positive charge and discharge terminal or the negative charge and discharge terminal, and sends the identification signal thereto.

According to the foregoing structure, the battery pack is connected to the charging device or the loading device only by the two positive and negative electric power connection terminals being a direct-current power transmission line. When the battery pack is connected to the charging device or the loading device, the information signal sending means can send the identification information to the charging device or the loading device through the electric power connection terminal. The charging device or the loading device can judge compatibility on the basis of the identification information transmitted through the electric power connection terminal, and it is possible to prevent the occurrence of a failure or a malfunction due to the connection of an incompatible battery pack before it happens. Also, the connection only by the two terminals reduces the influence of electromagnetic interference and electrostatic destruction and hence can prevent the occurrence of damage and a malfunction. Simplifying the structure of connection makes miniaturization and reduction in costs possible.

In a second invention of the present application, a battery pack includes a secondary battery, a positive charge and discharge terminal and a negative charge and discharge terminal which are connected to a positive electrode and a negative electrode of the secondary battery, respectively, and battery operating state detection means for detecting an operating state of the secondary battery. The battery pack is provided with information signal sending means which modulates operating state detection information detected by the battery operating state detection means into an operating state detection signal, which can be transmitted to a charging device for supplying charging energy to the secondary battery by connecting it to the positive charge and discharge terminal and the negative charge and discharge terminal or a loading device which is operated by the discharging energy of the secondary battery by connecting it to the positive charge and discharge terminal and the negative charge and discharge terminal through the positive charge and discharge terminal or the negative charge and discharge terminal, and sends the operating state detection signal thereto.

According to the foregoing structure, the battery pack is connected to the charging device or the loading device only by the two positive and negative electric power connection terminals being a direct-current power transmission line. When the battery pack is connected to the charging device or the loading device, the information signal sending means can send the operating state detection information to the charging device or the loading device through the electric power connection terminal. The charging device or the loading device can judge the operating state of the battery pack on the basis of the operating state detection information transmitted through the electric power connection terminal and it is possible to detect a malfunction such as the occurrence of something unusual and quickly respond thereto. Also, the connection only by the two terminals reduces the influence of electromagnetic interference and electrostatic destruction and hence can prevent the occurrence of damage and a malfunction. Simplifying the structure of connection makes miniaturization and reduction in costs possible.

In a third invention of the present application, a battery pack includes a secondary battery, a positive charge and discharge terminal and a negative charge and discharge terminal which are connected to a positive electrode and a negative electrode of the secondary battery, respectively, and battery operating state detection means for detecting the operating state of the secondary battery. The battery pack is provided with identification information memory means and information signal sending means. The identification information memory means stores identification information. The information signal sending means modulates the identification information read out of the identification information memory means or operating state detection information detected by the operating state detection means into an information signal, which can be transmitted to a charging device for supplying charging energy to the secondary battery by connecting it to the positive charge and discharge terminal and the negative charge and discharge terminal or a loading device which is operated by the discharging energy of the secondary battery by connecting it to the positive charge and discharge terminal and the negative charge and discharge terminal through the positive charge and discharge terminal or the negative charge and discharge terminal, and sends the information signal thereto.

According to the foregoing structure, the battery pack is connected to the charging device or the loading device only by the two positive and negative electric power connection terminals being a direct-current power transmission line, and the identification information and the operating state detection information can be transmitted from the information signal sending means to the charging device or the loading device through the electric power connection terminal. The charging device or the loading device can judge compatibility on the basis of the identification information transmitted through the electric power connection terminal, and it is possible to prevent the occurrence of a failure or a malfunction due to the connection of an incompatible battery pack before it happens. The charging device or the loading device can judge the operating state of the battery pack on the basis of the operating state detection information, and it is possible to detect a malfunction such as the occurrence of something unusual and quickly respond thereto. Also, the connection only by the two terminals reduces the influence of electromagnetic interference and electrostatic destruction and hence can prevent the occurrence of damage and a malfunction and the like.

In a fourth invention of the present application, a battery pack includes a secondary battery, a positive charge and discharge terminal and a negative charge and discharge terminal which are connected to a positive electrode and a negative electrode of the secondary battery, respectively, and battery operating state detection means for detecting the operating state of the secondary battery. The battery pack is provided with identification information memory means, information signal receiving means, and information signal sending means. The identification information memory means stores identification information. The information signal receiving means demodulates a question signal transmitted from a charging device or a loading device through the positive charge and discharge terminal or the negative charge and discharge terminal to take out question information. The information signal sending means modulates the identification information read out of the identification information memory means or operating state detection information detected by the operating state detection means into an information signal, which can be transmitted to the charging device for supplying charging energy to the secondary battery by connecting it to the positive charge and discharge terminal and the negative charge and discharge terminal or the loading device which is operated by the discharging energy of the secondary battery by connecting it to the positive charge and discharge terminal and the negative charge and discharge terminal through the positive charge and discharge terminal or the negative charge and discharge terminal, in response to a request described in the question information and sends the information signal thereto.

According to the foregoing structure, the battery pack is connected to the charging device or the loading device only by the two positive and negative electric power connection terminals being a direct-current power transmission line, and the information signal sending means can send the required identification information or the operating state detection information in response to the request from the charging device or the loading device received by the information signal receiving means through the electric power connection terminal. The charging device or the loading device can judge compatibility on the basis of the identification information transmitted through the electric power connection terminal, and it is possible to prevent the occurrence of a failure or a malfunction due to the connection of an incompatible battery pack before it happens. The charging device or the loading device can judge the operating state of the battery pack from the operating state detection information, and it is possible to detect a malfunction such as the occurrence of something unusual and quickly respond thereto. Also, the connection only by the two terminals reduces the influence of electromagnetic interference and electrostatic destruction and hence can prevent the occurrence of damage and a malfunction and the like.

In each of the foregoing structures, the battery pack is electrically connected to the charging device or the loading device only by two positive and negative connection terminals. Therefore, the electric connection between the battery pack and the charging device or the loading device can not only be simplified and miniaturized, but also receives the little influence of electromagnetic interference through an information transmission line and resists the influence of electrostatic destruction.

The information signal sending means in each of the foregoing battery packs is configured to send the identification signal or the operating state detection signal, into which a carrier wave having a predetermined frequency is modulated with the identification information or the operating state detection information by a predetermined modulation method, through the direct-current power transmission line. Therefore, it becomes possible to transmit information through the direct-current power transmission line and to connect the battery pack and the charging device or the loading device by the connection of the two terminals.

Since the information signal sending means is configured to subject a charging current flowing through the positive charge and discharge terminal or the negative charge and discharge terminal to a pulse modulation with the identification information or the operating state detection information, the information signal can be superimposed on the direct-current power transmission line by the pulse modulation for interrupting the charging and discharging current. Therefore, it becomes possible to transmit information through the direct-current power transmission line and to connect the battery pack and the charging device or the loading device by the connection of the two terminals.

In a fifth invention of the present application, a connection system of a battery pack connects a battery pack which includes a secondary battery and a positive charge and discharge terminal and a negative charge and discharge terminal connected to a positive electrode and a negative electrode of the secondary battery, respectively, to a charging device for supplying charging energy to the secondary battery by connecting it to the positive charge and discharge terminal and the negative charge and discharge terminal or to a loading device which is operated by the discharging energy of the secondary battery by connecting it to the positive charge and discharge terminal and the negative charge and discharge terminal. In the connection system of the battery pack, the battery pack is provided with identification information memory means and information signal sending means. The identification information memory means stores identification information. The information signal sending means modulates the identification information read out of the identification information memory means into an identification signal which can be transmitted to the charging device or the loading device through the positive charge and discharge terminal or the negative charge and discharge terminal and sends the identification signal thereto. The charging device or the loading device is provided with information signal receiving means and power source control means. The information signal receiving means demodulates the information signal transmitted through the positive charge and discharge terminal or the negative charge and discharge terminal and reads out the identification information. The power source control means decodes the read out identification information and controls an output of charging energy from the charging device or an input of discharging energy into the loading device.

According to the foregoing structure, the battery pack is connected to the charging device or the loading device only by the two positive and negative electric power connection terminals being a direct-current power transmission line, and when the battery pack is connected to the charging device or the loading device, the information signal sending means can send the identification information to the charging device or the loading device through the electric power connection terminal. The charging device or the loading device can demodulate the identification signal transmitted through the electric power connection terminal by the use of the information signal receiving means and take out the identification information. The charging device or the loading device can judge the compatibility of the battery pack from the identification information, and it is possible to prevent the occurrence of a failure or a malfunction due to the connection of an incompatible battery pack before it happens. Also, the connection only by the two terminals reduces the influence of electromagnetic interference and electrostatic destruction and hence can prevent the occurrence of damage and a malfunction and the like. Simplifying the structure of connection makes miniaturization and reduction in costs possible.

In a sixth invention of the present application, a connection system of a battery pack connects a battery pack which includes a secondary battery, a positive charge and discharge terminal and a negative charge and discharge terminal which are connected to a positive electrode and a negative electrode of the secondary battery, respectively, and battery operating state detection means for detecting an operating state of the secondary battery, to a charging device for supplying charging energy to the secondary battery by connecting it to the positive charge and discharge terminal and the negative charge and discharge terminal or to a loading device which is operated by the discharging energy of the secondary battery by connecting it to the positive charge and discharge terminal and the negative charge and discharge terminal. In the connection system of the battery pack, the battery pack is provided with information signal sending means which modulates operating state detection information detected by the battery operating state detection means into an operating state detection signal, which can be transmitted to the charging device or the loading device by connecting it to the positive charge and discharge terminal or the negative charge and discharge terminal through the positive charge and discharge terminal or the negative charge and discharge terminal, and sends the operating state detection signal thereto. The charging device or the loading device is provided with information signal receiving means and power source control means. The information signal receiving means demodulates the information signal transmitted through the positive charge and discharge terminal or the negative charge and discharge terminal and read out the operating state detection information. The power source control means controls an output of charging energy from the charging device or an input of discharging energy into the loading device on the basis of the read out operating state detection information.

According to the foregoing structure, the battery pack is connected to the charging device or the loading device only by the two positive and negative electric power connection terminals being a direct-current power transmission line, and the information signal sending means can send the operating state detection information of the battery pack to the charging device or the loading device through the electric power connection terminal. The charging device or the loading device can judge the operating state of the battery pack on the basis of the operating state detection information transmitted through the electric power connection terminal, and it is possible to detect a malfunction such as the occurrence of something unusual and quickly respond thereto. Also, the connection only by the two terminals reduces the influence of electromagnetic interference and electrostatic destruction and hence can prevent the occurrence of damage and a malfunction. Simplifying the structure of connection makes miniaturization and reduction in costs possible.

In a seventh invention of the present application, a connection system of a battery pack connects a battery pack which includes a secondary battery, a positive charge and discharge terminal and a negative charge and discharge terminal which are connected to a positive electrode and a negative electrode of the secondary battery, respectively, and battery operating state detection means for detecting the operating state of the secondary battery, to a charging device for supplying charging energy to the secondary battery by connecting it to the positive charge and discharge terminal and the negative charge and discharge terminal or to a loading device which is operated by the discharging energy of the secondary battery by connecting it to the positive charge and discharge terminal and the negative charge and discharge terminal. In the connection system of the battery pack, the battery pack is provided with identification information memory means and information signal sending means. The identification information memory means stores identification information. The information signal sending means modulates the identification information read out of the identification information memory means or operating state detection information detected by the battery operating state detection means into an information signal, which can be transmitted to the charging device or the loading device through the positive charge and discharge terminal or the negative charge and discharge terminal, and sends the information signal thereto. The charging device or the loading device is provided with information signal receiving means and power source control means. The information signal receiving means demodulates the information signal transmitted through the positive charge and discharge terminal or the negative charge and discharge terminal and read out the identification information or the operating state detection information. The power source control means controls an output of charging energy from the charging device or an input of discharging energy into the loading device on the basis of the read out identification information or operating state detection information.

According to the foregoing structure, the battery pack is connected to the charging device or the loading device only by the two positive and negative electric power connection terminals being a direct-current power transmission line, and the information signal sending means can send the identification information and the operating state detection information of the battery pack to the charging device or the loading device through the electric power connection terminal. The charging device or the loading device can judge compatibility on the basis of the identification information transmitted through the electric power connection terminal, and it is possible to prevent the occurrence of a failure or a malfunction due to the connection of an incompatible battery pack before it happens. The charging device or the loading device can judge the operating state of the battery pack from the operating state detection information, and it is possible to detect a malfunction such as the occurrence of something unusual and quickly respond thereto. Also, the connection only by the two terminals reduces the influence of electromagnetic interference and electrostatic destruction and hence can prevent the occurrence of damage and a malfunction.

In an eighth invention of the present application, a connection system of a battery pack connects a battery pack which includes a secondary battery, a positive charge and discharge terminal and a negative charge and discharge terminal which are connected to a positive electrode and a negative electrode of the secondary battery, respectively, and battery operating state detection means for detecting the operating state of the secondary battery, to a charging device for supplying charging energy to the secondary battery by connecting it to the positive charge and discharge terminal and the negative charge and discharge terminal or to a loading device which is operated by the discharging energy of the secondary battery by connecting it to the positive charge and discharge terminal and the negative charge and discharge terminal. In the connection system of the battery pack, the battery pack is provided with identification information memory means, information signal receiving means, and information signal sending means. The identification information memory means stores identification information. The information signal receiving means demodulates a question signal transmitted from the charging device or the loading device through the positive charge and discharge terminal or the negative charge and discharge terminal to take out question information. The information signal sending means modulates the identification information read out of the identification information memory means or operating state detection information detected by the battery operating state detection means into a response signal in response to a request described in the question information and sends the response signal through the positive charge and discharge terminal or the negative charge and discharge terminal. The charging device or the loading device is provided with information signal sending means, information signal receiving means, and power source control means. The information signal sending means modulates the question information into a question signal which can be transmitted through the positive charge and discharge terminal or the negative charge and discharge terminal and sends the question signal to the connected battery pack. The information signal receiving means demodulates the response signal transmitted from the battery pack through the positive charge and discharge terminal or the negative charge and discharge terminal and read out the identification information or the operating state detection information. The power source control means decodes the read out identification information or the operating state detection information and controls an output of charging energy from the charging device or an input of discharging energy into the loading device.

According to the foregoing structure, the battery pack is connected to the charging device or the loading device only by the two positive and negative electric power connection terminals being a direct-current power transmission line, and the charging device or the loading device can send a necessary request to the connected battery pack by the information signal sending means as the question signal. When the battery pack is connected, if the question signal requires the response of the identification information for identifying the type of battery pack, the battery pack having received the question signal demodulates the question signal and takes out the question information by the information signal receiving means and sends the identification information from the information signal sending means to the charging device or the loading device through the electric power connection terminal in response to the request of the question information. In the charging device or the loading device, the information signal receiving means can demodulate the identification signal transmitted through the electric power connection terminal and take out the identification information, so that the charging device or the loading device can judge the compatibility of the battery pack from the identification information and hence it is possible to prevent the occurrence of a failure or a malfunction due to the connection of an incompatible battery pack before it happens. Since the identification of the battery pack is identification processing by bidirectional communication, it is possible to improve an identification level. Also, the charging device or the loading device can send a request with regard to the operating state of the battery pack from the information signal sending means to the battery pack as the question signal, if required. Upon receiving of the question signal, the battery pack demodulates the question signal and takes out the question information by the use of the information signal receiving means and sends the operating state detection signal into which the operating state detection information detected by the battery operating state detection means is modulated to the charging device or the loading device through the electric power connection terminal by the information signal sending means in response to the request of the question information. Since the charging device or the loading device can demodulate the operating state detection signal transmitted through the electric power connection terminal by the information signal receiving means and take out the operating state detection information, the charging device or the loading device can judge the operating state of the battery pack from the operating state detection information and hence it is possible to carry out control corresponding to the operating state of the battery pack. Since the detection of the operating state of the battery pack is processed by bidirectional communication, the charging device or the loading device can obtain necessary operating state information, if required. Also, since the connection of the two terminals of a direct-current power transmission line connection is only required for carrying out the bidirectional communication, it is possible to reduce the influence of electromagnetic interference and electrostatic destruction and hence prevent the occurrence of damage and a malfunction and the like. Simplifying the structure of connection makes miniaturization and reduction in costs possible.

The information signal sending means in each of the foregoing connection systems is configured to send the identification signal, the operating state detection signal, or the question signal, into which a carrier wave having a predetermined frequency is modulated with the identification information, the operating state detection information, or the question information by a predetermined modulation method, through the direct-current power transmission line. Therefore, it becomes possible to transmit information through the direct-current power transmission line and to connect the battery pack and the charging device or the loading device by the connection of the two terminals.

Since the information signal sending means is configured to subject a charging or discharging current flowing through the direct-current power transmission line to a pulse modulation with the identification information, the operating state detection information, or the question information, the information signal can be superimposed on the direct-current power transmission line by carrying out the pulse modulation of the charging and discharging current. Therefore, it becomes possible to transmit information through the direct-current power transmission line and to connect the battery pack and the charging device or the loading device by the connection of the two terminals.

The information signal receiving means in each of the foregoing connection systems is configured to demodulate the identification signal, the operating state detection signal, or the question signal transmitted through the direct-current power transmission line by a predetermined demodulation method and to take out the identification information, the operating state detection information, or the question information. Therefore, it becomes possible to transmit information through the direct-current power transmission line and to connect the battery pack and the charging device or the loading device by the connection of the two terminals.

Since the information signal receiving means is configured to compose a pulse demodulator for taking out variation of a current in the pulse-modulated charging or discharging current flowing through the direct-current power transmission line, the information signal can be superimposed on the direct-current power transmission line by the pulse modulation of the charging and discharging current. Therefore, it becomes possible to transmit information through the direct-current power transmission line and to connect the battery pack and the charging device or the loading device by the connection of the two terminals.

BEST MODE FOR CARRYING OUT THE INVENTION

Embodiments of the present invention will be hereinafter described with reference to the accompanying drawings. The embodiments are just examples embodying the present invention and do not limit the technical scope of the present invention.

Figure 1:
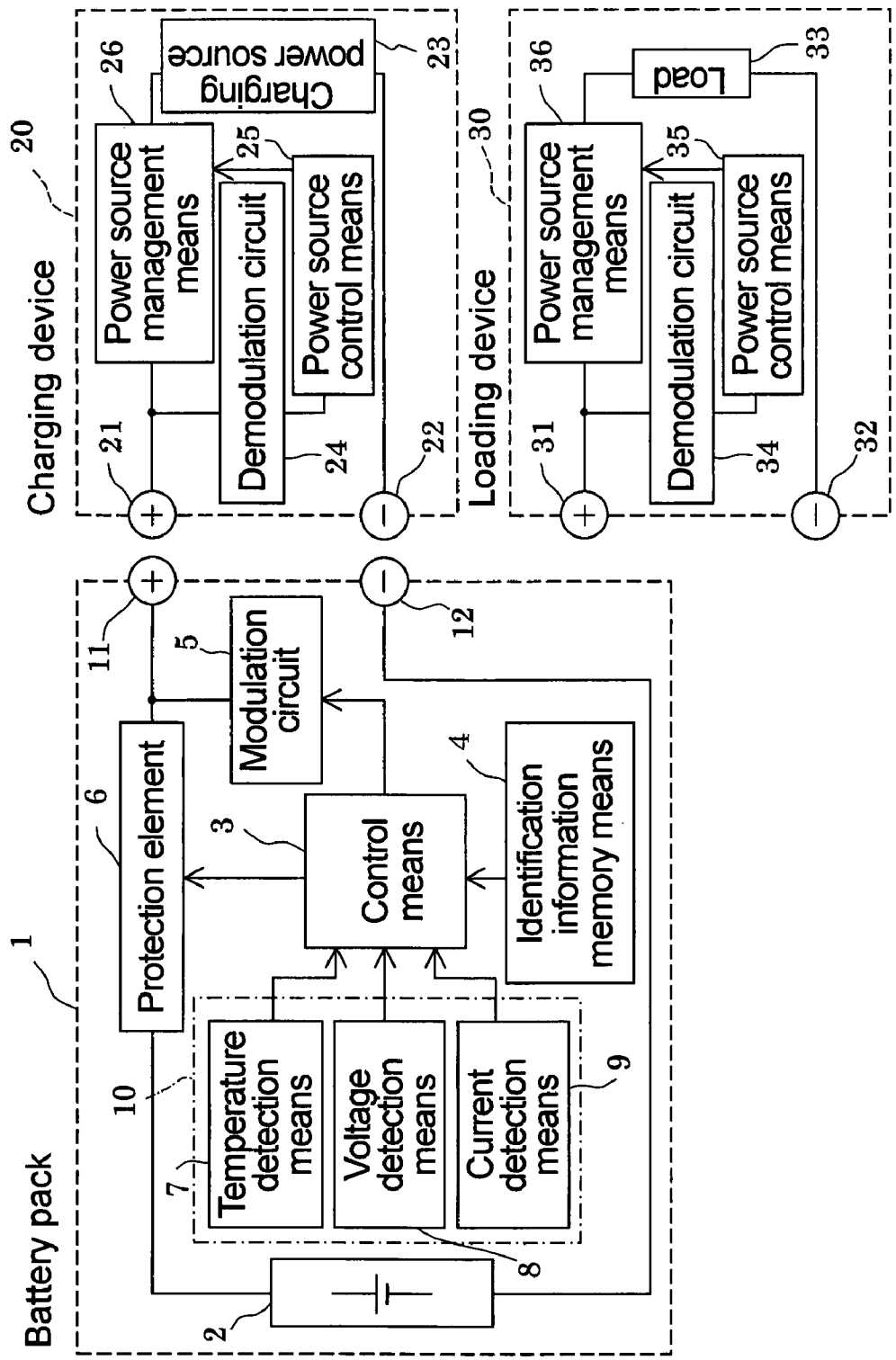
FIG. 1 is a block diagram showing the structure of a battery pack and a connection system thereof according to a first embodiment.

FIG. 1 shows a battery pack 1 and a connection system of the battery pack which is composed of a charging device 20 and a loading device 30 connected to the battery pack 1 according to a first embodiment of the present invention.

When a secondary battery 2 of the battery pack 1 is charged, a positive charge and discharge terminal 11 of the battery pack 1 is connected to a positive charge terminal 21 of the charging device 20 and a negative charge and discharge terminal 12 is connected to a negative charge terminal 22 so that charging energy is supplied from the charging device 20 to charge the secondary battery 2. When the battery pack 1 is connected to the loading device 30 which operates by discharging energy from the battery pack 1, the positive charge and discharge terminal 11 is connected to a positive discharge terminal 31 of the loading device 30 and the negative charge and discharge terminal 12 is connected to a negative discharge terminal 32 so that the loading device 30 operates by discharging energy from the secondary battery 2.

The foregoing battery pack 1 is provided with a battery protection circuit. Battery operating state detection means 10, which includes temperature detection means 7 for detecting battery temperatures, voltage detection means 8 for detecting a battery voltage, and current detection means 9 for detecting a charging and discharging current, inputs operating state detection information into a control means 3, and the control means 3 detects the over-discharge state, over-charge state, and over-current state of the secondary battery 2 on the basis of the operating state detection information. When these states are detected, the control means 3 allows a protection element (FET) 6 to interrupt a charge and discharge circuit in order to protect the secondary battery 2. The battery pack 1 is also provided with a function of identifying the charging device 20 and the loading device 30 corresponding to the battery pack 1. The battery pack 1 needs to be charged in a state where each charge condition of voltage, current, and temperature corresponding to the secondary battery 2 is appropriately controlled. The battery pack 1 is configured to identify a compatible charging device, that is, the charging device 20 in this instance, in order to prevent the occurrence of a failure and an accident when being connected to an incompatible charging device. Furthermore, the battery pack 1 needs to identify the compatible loading device 30 in order to operate the loading device 30 by appropriate discharging energy and prevent the occurrence of a failure and a malfunction of the loading device 30 due to inappropriate discharging energy and insufficient power source control. The foregoing identification function works by including identification information memory means 4 on which identification information for identifying a model is stored and modulation circuit (being information signal sending means) 5 for modulating the identification information read out of the identification information memory means 4 into an identification signal which can be sent by being superimposed on a direct-current power transmission line. The control means 3 into which the identification information is input from the identification information memory means 4 inputs the identification information into the modulation circuit 5, if required. Since the modulation circuit 5 superimposes the identification signal which is modulated with the identification information by a modulation method described later on the direct-current power transmission line, the identification signal is sent to the charging device 20 or the loading device 30 through the direct-current power transmission line. In this instance, the identification information memory means 4 is a memory for storing ID numbers. Alternatively, the identification information memory means 4 may simply be a resistor with a specific resistance value or may complicatedly be a memory for storing a specific signal and an encrypted signal, and hence it is possible to perform optimum structure in accordance with the level of precision in identification and decryption.

When the battery pack 1 having the aforementioned structure is connected to the charging device 20, the positive charge and discharge terminal 11 is connected to the positive charge terminal 21 of the charging device 20 and the negative charge and discharge terminal 12 is connected to the negative charge terminal 22 of the charging device 20 to form the direct-current power transmission line through which a charging current from the charging device 20 flows into the battery pack 1. Since the control means 3 reads the identification information out of the identification information memory means 4 and inputs it into the modulation circuit 5 at the start of connection, the modulation circuit 5 sends the identification signal, into which the identification information is modulated by the modulation method described later, to the charging device 20 through the positive charge and discharge terminal 11 and the positive charge terminal 21.

The charging device 20 is configured to include a charging power source 23 connected to the positive charge terminal 21 and the negative charge terminal 22, a demodulation circuit (being information signal receiving means) 24 which is connected to the positive charge terminal 21 and takes out the identification signal sent through the direct-current power transmission line to demodulate it into the identification information, and power source control means 25 which judges the correctness of the identification information output from the demodulation circuit 24 and controls the output of the charging power source 23 by power source management means 26. When the battery pack 1 is connected, the demodulation circuit 24 demodulates the sent identification signal to take out the identification information and inputs it into the power source control means 25. The power source control means 25 judges whether the transmitted identification information is correct or not. When the identification information is correct, the power source control means 25 permits the output of charging energy from the charging power source 23 by the power source management means 26 so that the charging energy is supplied to the battery pack 1. When the identification information is not correct, on the other hand, the power source management means 26 does not permit output from the charging power source 23 by the control of the power source control means 25 so that the battery pack 1 is judged to be incompatible and battery charging is not started. Thus, when an incompatible battery charger is connected to the battery pack 1, battery charging is not carried out so that it is possible to prevent the occurrence of a failure due to the connection of the inappropriate battery charger.

When the battery pack 1 having the aforementioned structure is connected to the loading device 30, the positive charge and discharge terminal 11 is connected to the positive discharge terminal 31 of the loading device and the negative charge and discharge terminal 12 is connected to the negative discharge terminal 32 of the loading device 30 to form the direct-current power transmission line through which a discharging current from the battery pack 1 flows into the loading device 30. Since the control means 3 reads the identification information out of the identification information memory means 4 and inputs it into the modulation circuit 5 at the start of connection, the modulation circuit 5 modulates the identification information into the identification signal and sends it to the loading device 30 through the positive charge and discharge terminal 11 and the positive discharge terminal 31.

The loading device 30 has the same structure as the charging device 20 as for the processing of the identification information. The loading device 30 is configured to include a load 33 connected to the positive discharge terminal 31 and the negative discharge terminal 32, a demodulation circuit (being information signal receiving means) 34 which is connected to the positive discharge terminal 31 and takes out the identification signal sent through the direct-current power transmission line to demodulate it into the identification information, power source control means 35 which judges the correctness of the identification information output from the demodulation circuit 34 and controls electric power supply to the load 33, and power source management means 36 which manages electric power supply to the load 33. When the battery pack 1 is connected, the demodulation circuit 34 demodulates the sent identification signal to take out the identification information and inputs it into the power source control means 35. The power source control means 35 judges whether the transmitted identification information is correct or not. When the identification information is correct, the power source control means 35 outputs an electric power supply permission signal to the power source management means 36 and the power source management means 36 permits the supply of discharging energy to the load 33 so that the discharging energy is supplied from the battery pack 1 to the load 33 to allow the load 33 to operate. When the identification information is not correct, the power source control means 35 does not output the electric power supply permission signal to the power source management means 36 so that the connected battery pack 1 is judged to be incompatible and the load 33 cannot be allowed to operate. Thus, when an incompatible battery power source is connected to the loading device 30, the loading device 30 does not operate and hence it is possible to prevent the occurrence of a failure and a malfunction due to the connection of the inappropriate battery power source.

In the foregoing battery pack 1 and the connection system for connecting the battery pack 1 to the charging device 20 or the loading device 30, the charging device 20 and the loading device 30 each have a separate body. In a cellular phone, a notebook PC, and the like, the charging device 20 and the loading device 30 may be in an integrated body.

Figure 2:
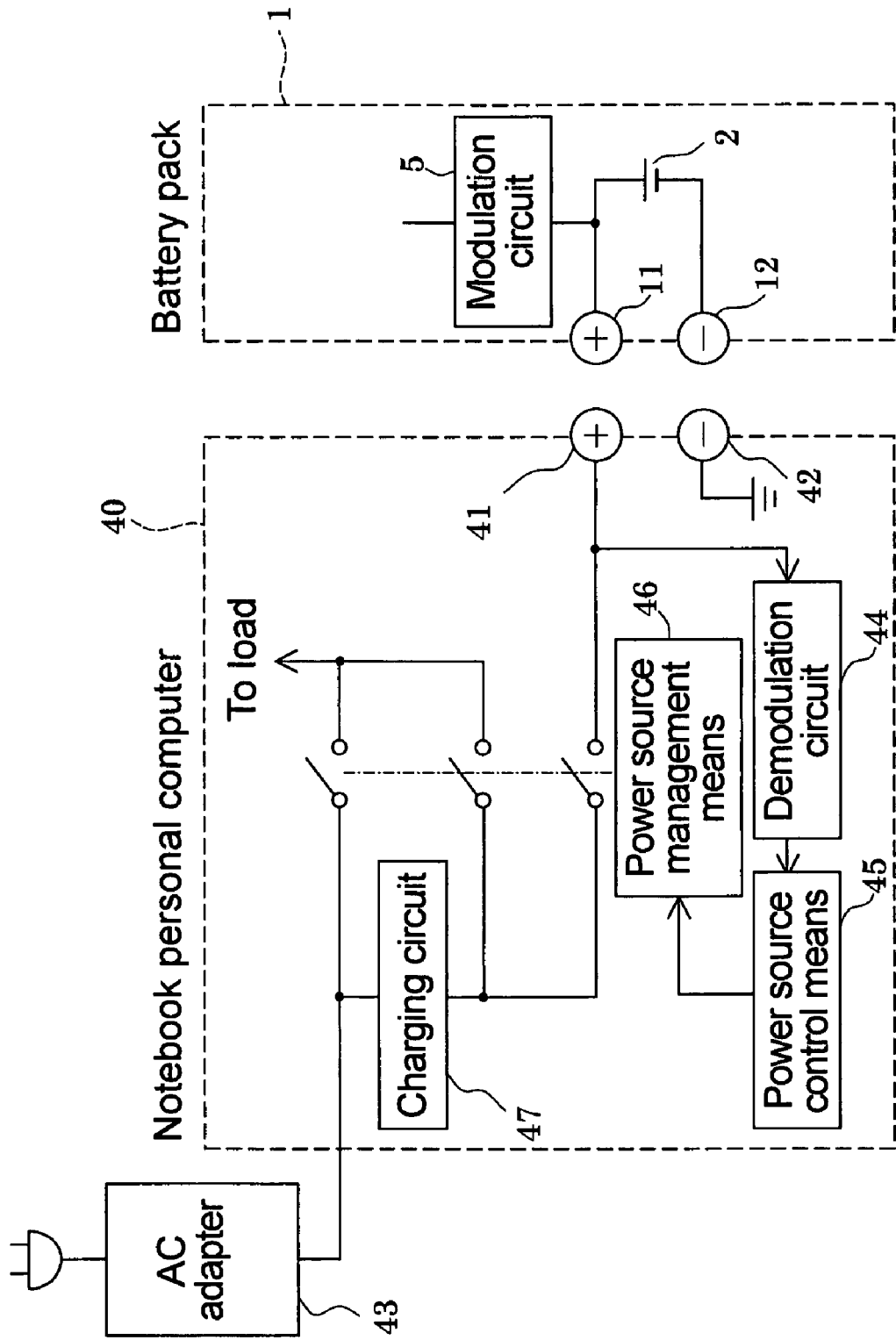
FIG. 2 is a block diagram showing the structure in which the above connection system is applied to a personal computer.

FIG. 2 shows an example of the structure of a power source circuit of a notebook PC 40. An AC adapter 43 being an auxiliary device of the notebook PC 40 serves as a direct-current power supply source during charging the battery pack 1 and in a usage state where an AC power source is available. Accordingly, a system for receiving the identification information, which is provided in each of the charging device 20 and the loading device 30, is made common as a demodulation circuit (being information signal receiving means) 44, power source control means 45, and power source management means 46. In the notebook PC 40, the power source management means 46 is an existing component for controlling the switching between a battery power source and the AC power source.

In the case of the notebook PC 40 having the foregoing structure, when the positive charge and discharge terminal 11 is connected to a positive power source terminal 41 of the notebook PC 40 and the negative charge and discharge terminal 12 is connected to a negative power source terminal 42 to install the battery pack 1 into the notebook PC 40, the identification signal is sent from the modulation circuit 5 to the notebook PC 40 through the positive charge and discharge terminal 11 and the positive power source terminal 41. Therefore, the notebook PC 40 demodulates the identification signal by means of the demodulation circuit 44 and takes out the identification information and inputs it into the power source control means 45. The power source control means 45 judges the correctness of the identification information. When the identification information is correct, the power source control means 45 outputs a connection permission signal to the power source management means 46 so that the power source management means 46 permits the connection of the battery pack 1. Therefore, the formal battery pack 1 is identified by the identification information and the charge and discharge of the battery pack 1 becomes possible. When an imitation with incorrect identification information or the like is connected, charge and discharge is not carried out. Accordingly, it is possible to prevent the occurrence of a failure and a malfunction due to the connection of an incompatible battery pack 1.

Figure 7:
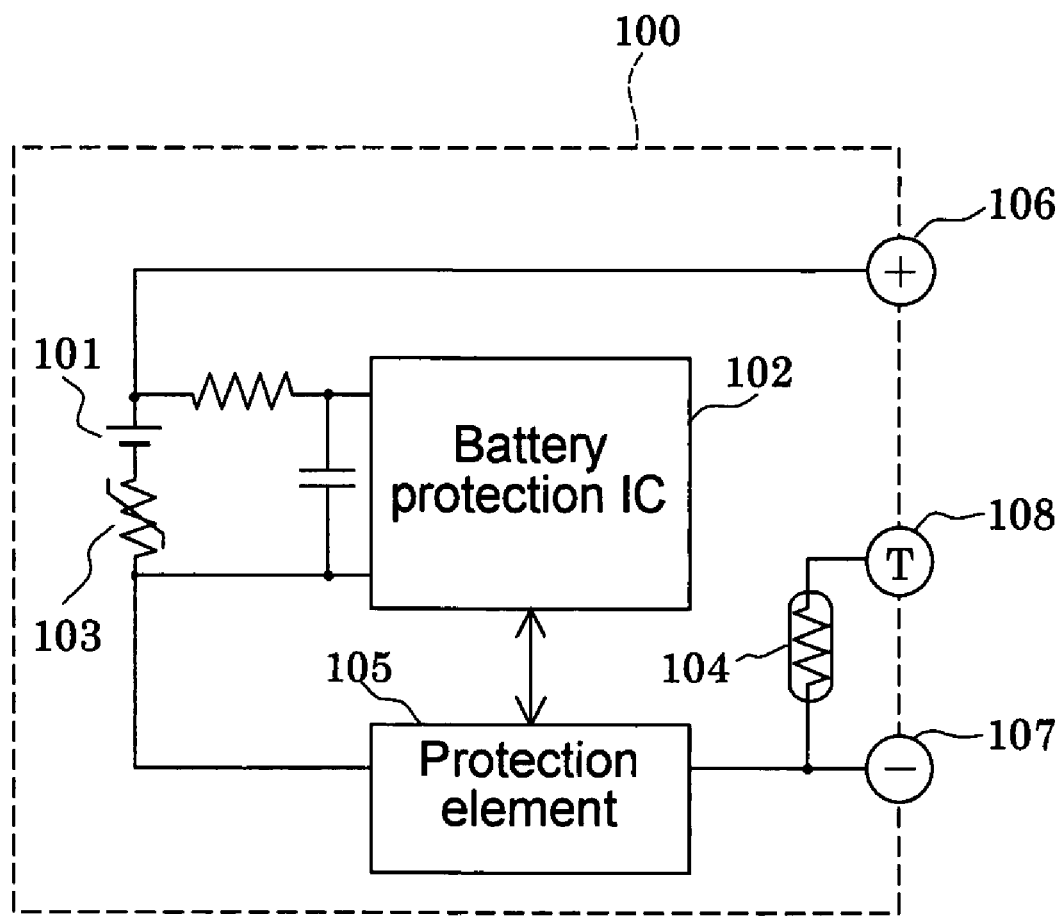
FIG. 7 is a block diagram showing the structure of a conventional battery pack which is applied to a cellular phone.
Figure 8:
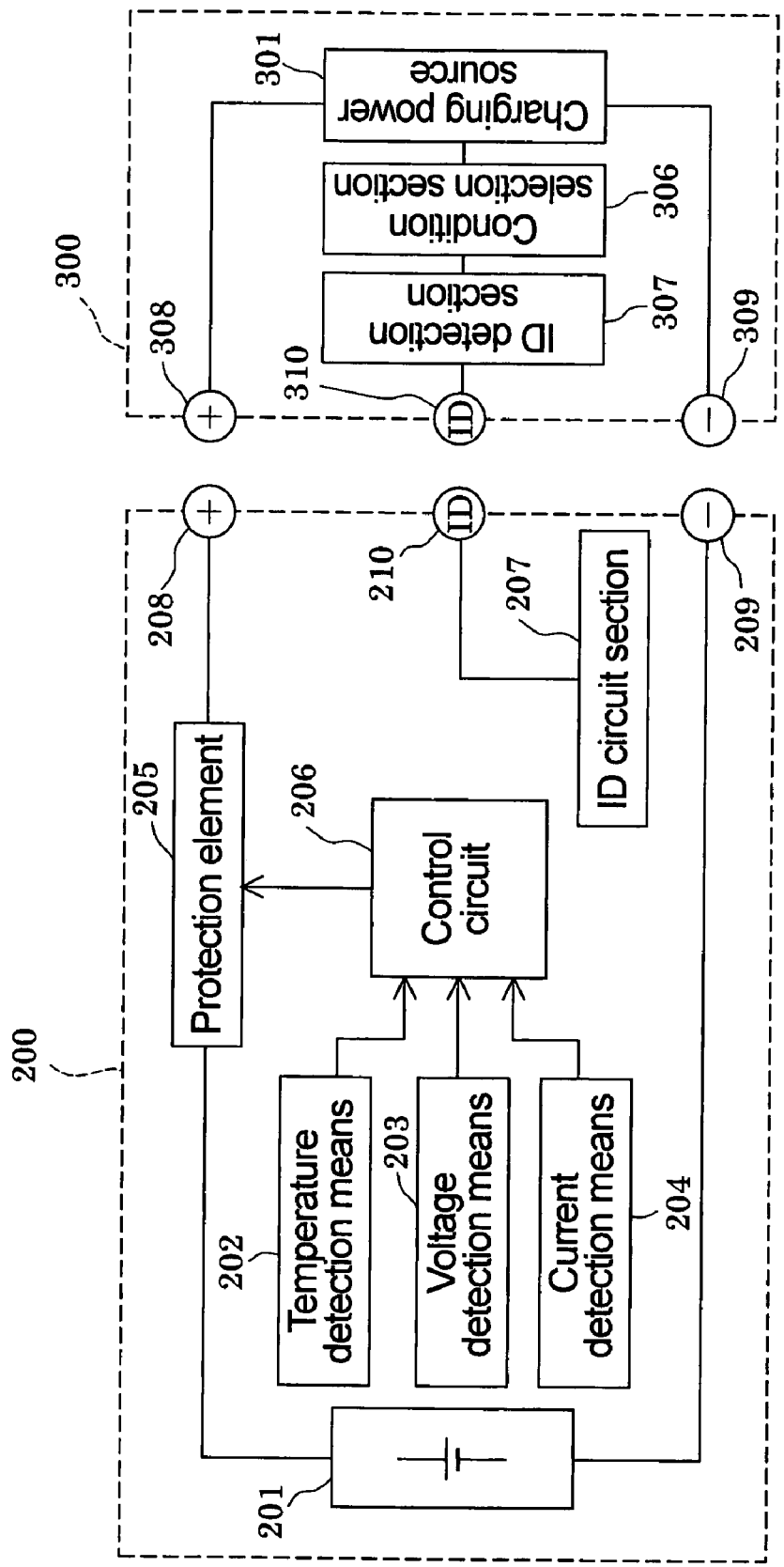
FIG. 8 is a block diagram showing a conventional battery pack and a connection system thereof which are provided with an identification function.

As in the example of a battery pack of a cellular phone previously shown in FIG. 7 as one of background technologies of the present invention, when the battery pack 100 is connected to a charging device to charge the secondary battery 101, at least battery temperatures are detected to carry out charge control in accordance with the state of the secondary battery 101. Thus, when the battery pack 100 is connected to the charging device, it is necessary to connect a temperature detection terminal 108 for detecting the battery temperature in addition to the direct-current power transmission line of a positive terminal 106 and a negative terminal 107 and hence the battery pack 100 and the charging device are connected to each other with at least three terminals. In a case where information is transmitted via a communication bus like a smart battery system in a notebook PC 40, at least four terminals have to be connected. Increase in the number of connection terminals like this, as described above, tends to receive the influence of electromagnetic interference and electrostatic destruction and is not desirable because of increase in costs and the like.

In the structure according to the present embodiment, it is possible to transmit information in addition to the transmission of direct-current power only by the connection of the positive and negative connection terminals of the direct-current power transmission line. Not only the transmission of the aforementioned identification information but also information with regard to a battery operating state can be transmitted to the charging device 20 or the loading device 30 only by the two connections of the positive and negative charge and discharge terminals 11 and 12.

As shown in FIG. 1, since detection information on battery temperatures, a battery voltage, and a charging and discharging current is input from the battery operating state detection means 10 to the control means 3 provided in the battery pack 1, the control means 3 can output the operating information detection information to the modulation circuit 5. The modulation circuit 5, into which the operating state detection information is input, modulates the operating state detection information into an operating state detection signal which can be superimposed on the direct-current power transmission line by a modulation method described later and can send the operating state detection signal to the charging device 20 or the loading device 30 through the direct-current power transmission line. In the charging device 20, the demodulation circuit 24 takes the operating state detection information necessary for charge control out of the operating state detection signal sent through the direct-current power transmission line, and the power source control means 25 controls the power source management means 26 on the basis of the operating state detection information. Accordingly, it is possible to supply charging energy, in which the charging voltage and the charging current are regulated in accordance with the operating state of the secondary battery 2, to the battery pack 1. Also, since the control means 3 of the battery pack 1 monitors a charge state and a discharge state, when information indicating an over-charge state or the occurrence of an abnormal phenomenon is transmitted from the battery pack to the charging device 20, the charging device 20 carries out control for stopping charging. In a case where the loading device 30 is a notebook PC, when the notebook PC is operated by the discharging energy of the battery pack 1, it is necessary to save working data before the secondary battery 2 runs out to prevent data corruption. Since the control means 3 monitors the discharge state, when information indicating the little amount of remaining capacity or the occurrence of an abnormal phenomenon is transmitted from the battery pack to the loading device 30, the loading device 30 can display a warning signal and a user can quickly carry out operation for saving the data.

The aforementioned smart battery system or the like realizes the structure of transmitting the operating state detection information from the foregoing battery pack 1 to the charging device 20 and the loading device 30, but it is necessary to connect the battery pack 1 to the charging device 20 or the loading device 30 with the connection of at least four terminals. According to the structure of the present embodiment, as described above, it becomes possible to carry out charge and discharge control only by the connection of the two terminals of the direct-current power transmission line which is essentially indispensable to this type of structure.

Next, a concrete example of signal transmission through a power line by superimposing a modulation signal of the identification information or the operating state detection information on the direct-current power transmission line will be described. To transmit the identification information or the operating state detection information as binary digital information by superimposing it on the direct-current power transmission line as direct current, a method for superimposing and carrying a signal wave into which a carrier wave with a predetermined frequency is modulated on a direct current or a method for subjecting a direct current flowing through the direct-current power transmission line to a pulse modulation is applicable.

Using an ASK (Amplitude Shift Keying) modulation which interrupts a carrier wave in accordance with digital information can easily carry a modulated carrier wave through the direct-current power transmission line but is susceptible to noise. Thus, the modulation circuit 5 and the demodulation circuits 24 and 34 with the structure of the present embodiment use a FSK (Frequency Shift Keying) modulation. The modulation circuit 5 subjects carrier waves having two frequencies to the FSK modulation with digital information (being the identification information or the operating state detection information) output from the control means 3 and sends it on the direct-current power transmission line as the identification signal or the operating state detection signal. The charging device 20 or the loading device 30, which receives the identification signal or the operating state detection signal carried on the direct-current power transmission line, takes the identification signal or the operating state detection signal out of the direct-current power transmission line by the demodulation circuit 24 or 34. After the identification signal or the operating state detection signal is separated into the two carrier waves and the waves are detected, composing the two carrier waves makes it possible to demodulate the identification signal or the operating state detection signal into the digital information of the identification information or the operating state detection information. In the present embodiment, the carrier waves have audio frequencies.

Figure 3:
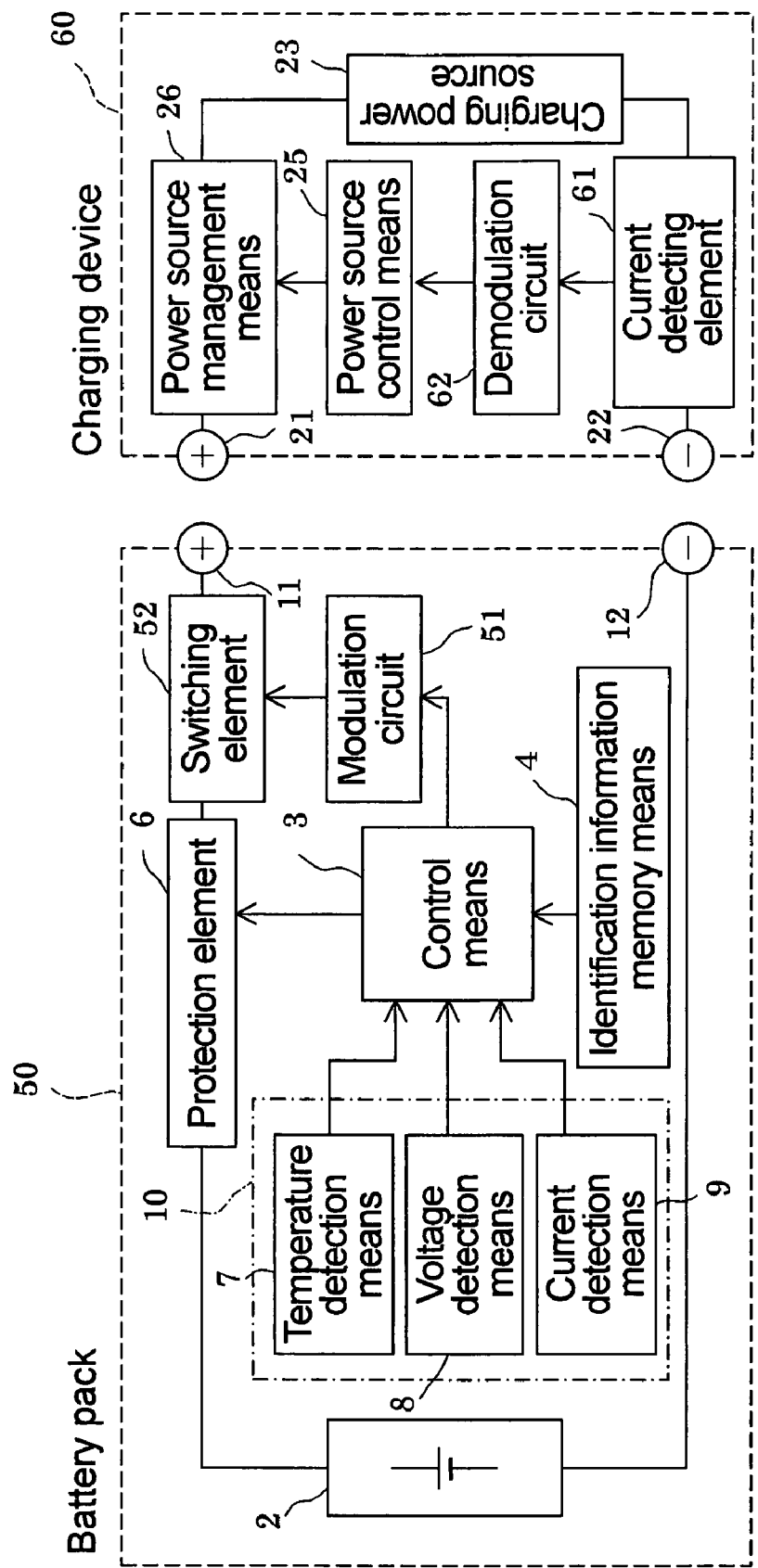
FIG. 3 is a block diagram showing an example of the structure of signal transmission using a direct-current power transmission line according to a second embodiment.

FIG. 3 shows the structure of a second embodiment in which a direct current flowing through the direct-current power transmission line is subjected to a pulse modulation with identification information or operating state detection information to transmit information. Since this method for transmitting information interrupts the direct current flowing through the direct-current power transmission line, it is preferable to connect a battery pack 50 to a charging device 60 as shown in the drawing, and it is possible to apply a pulse modulation method described later in a case where the battery pack 50 is connected to both the charging device and a loading device. The same reference numbers as those of the first embodiment denote identical components, respectively, and descriptions thereof will be omitted.

In FIG. 3, in a case where the identification information is sent from the battery pack 50 to the charging device 60, control means 3 into which the identification information has been input from identification information memory means 4 outputs the identification information to a modulation circuit (being information signal sending means) 51 when the battery pack 50 is connected to the charging device 60. Thus, the modulation circuit 51 carries out the pulse modulation by applying a pulse signal corresponding to the identification information to a gate of a switching element 52, which is connected to a positive direct-current circuit in series, and interrupting the charging current. A positive charge and discharge terminal 11 and a negative charge and discharge terminal 12 of the battery pack 50 are connected to a positive charge terminal 21 and a negative charge terminal 22 of the charging device 60, respectively, and the charging current flows from a charging power source 23 of the charging device 60 into the battery pack 50, so that the charging current is interrupted by the pulse modulation.

Since the pulse-modulated electric current flows through a current detecting element (for example, a resistor) 61, which is connected to a negative direct-current circuit of the charging device 60 in series, a demodulation circuit (being information signal receiving means) 62 can take out the pulse-modulated identification information by the ON/OFF state of the charging current detected by the current detecting element 61. Since the identification information taken out by the demodulation circuit 62 is input into power source control means 25, the power source control means 25 judges the correctness of the identification information. When the identification information is not correct, the power source control means 25 allows power source management means 26 to stop the supply of charging energy from the charging power source 23.

In the foregoing structure, since the charging current is subjected to the pulse modulation in a state where the charging current flows from the charging device 60 into the battery pack 50, when a battery pack incompatible with the charging device 60 is connected, there is a risk of damaging the incompatible battery pack. Therefore, it is preferable that an electric current for identification the voltage and current values of which are lowered flow until the identification information of the connected battery pack 50 is identified and the normal charging energy be supplied when the identification information is judged to be correct.

When the operating state detection information of a secondary battery 2 is sent from the battery pack 50, the control means 3 gathers each of the information on battery temperatures, a battery voltage, and a battery current from battery operating state detection means 10. If the control means 3 inputs the operating state detection information into the modulation circuit 51, the modulation circuit 51 applies a control signal which has been subjected to the pulse modulation with the operating state detection information to the gate of the switching element 52, so that a charging current is subjected to the pulse modulation. Since the current detecting element 61 can detect the pulse-modulated charging current in the charging device 60 as a pulse signal, it is possible to control charging energy supplied to the battery pack 50 from the operating state detection information as in the case of the identification information.

Figure 4A:
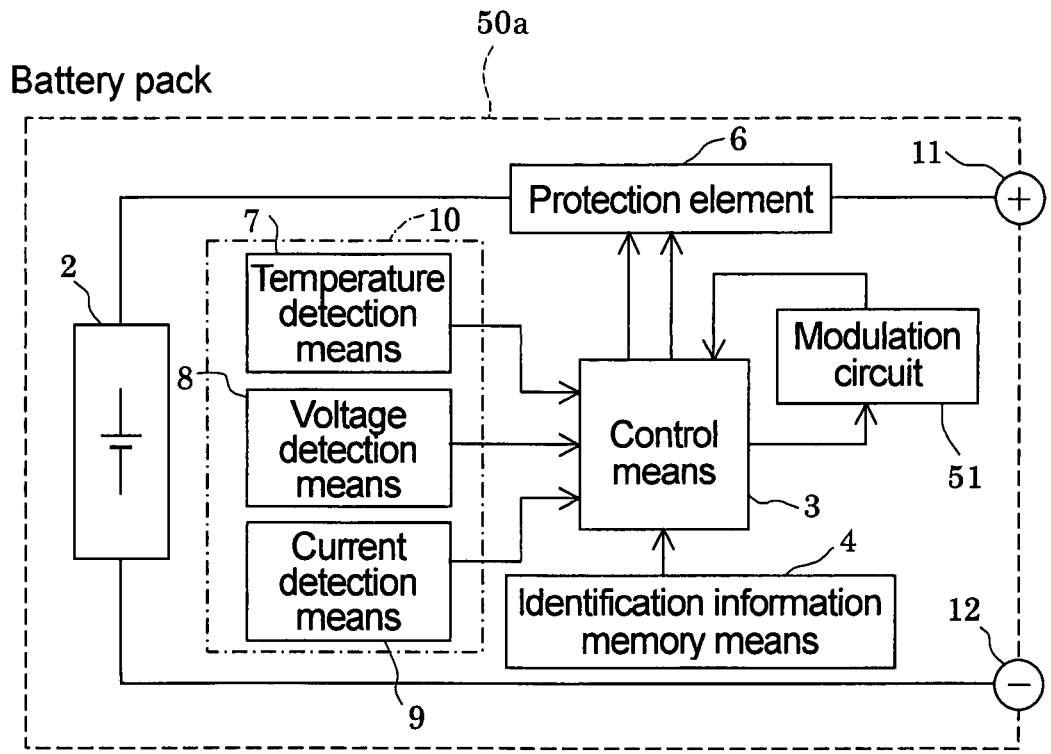
FIGS. 4A to 4B are block diagrams showing modifications of the above structure.

In the foregoing structure, the switching element 52 is used for interrupting the charging current, but a protection element 6, which is connected to the switching element 52 in series, is a switching element (FET) too. Thus, like a battery pack 50a as shown in FIG. 4A, if a control signal output from the modulation circuit 51 is input into a gate of the protection element 6 through the control means 3, it is possible to remove the switching element 52 and carry out the transmission of an information signal to a loading device by a pulse-duration modulation.

Figure 4B:
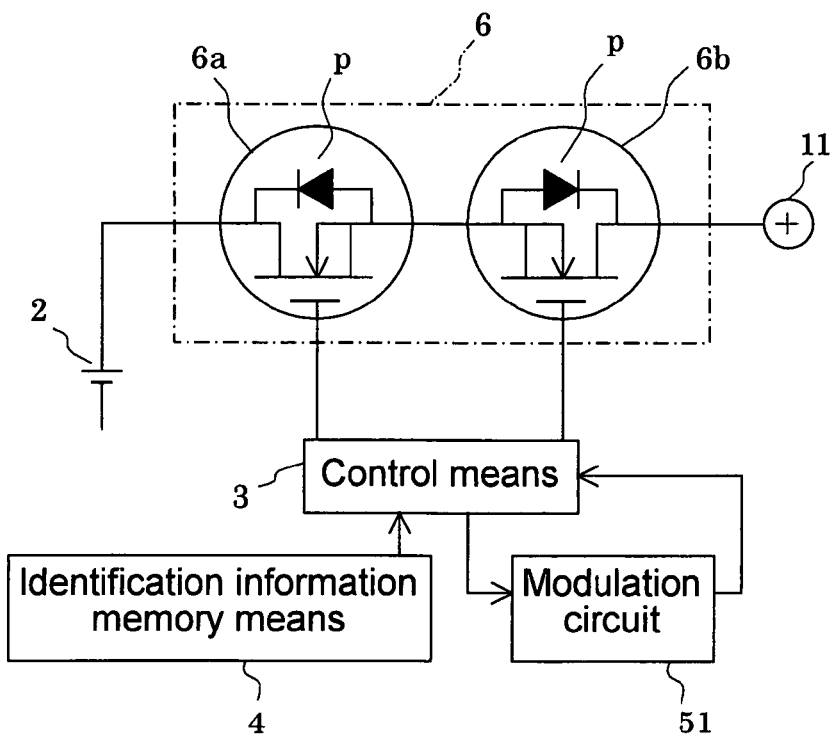

With reference to FIG. 4B which concretely shows the protection element 6, the protection element 6 includes two FETs, that is, a discharge FET 6a being a power MOSFET for discharge control and a charge FET 6b being a power MOSFET for charge control. Since the control means 3 makes the discharge FET 6a and the charge FET 6b into conductions under normal conditions, it is possible to carry out the charge and discharge of the secondary battery 2. When the control means 3 detects an overcharge state, the control means 3 makes the charge FET 6b into a cutoff state to stop charging. When the control means 3 detects an over-discharge state, the control means 3 makes the discharge FET 6a into a cutoff state to stop discharging.

Figure 5A:
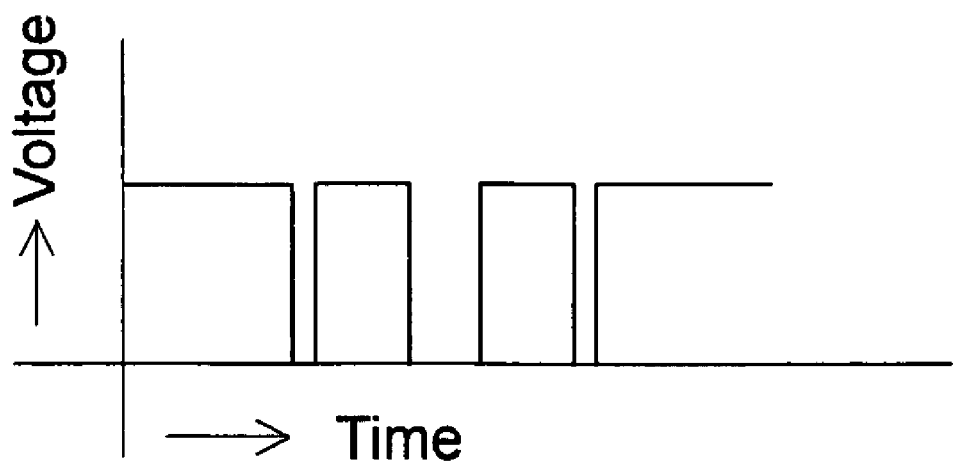
FIG. 5A is a graph showing variation in information transmission which subjects a charging and discharging current to pulse-duration modulation in the case of a charging device.

When the battery pack 50a is connected to the charging device 60 to transmit an information signal by the pulse-duration modulation, in the case of transmitting the identification information, the control means 3 reads the identification information out of the identification information memory means 4 and inputs it into the modulation circuit 51. The modulation circuit 51 performs the pulse-duration modulation in accordance with the identification information and inputs a modulated signal into a gate of the charge FET 6b through the control means 3. Since the charge FET 6b, into the gate of which the pulse-duration modulated signal corresponding to the identification information is input, as shown in FIG. 5A, conducts and interrupts an electric current between its source and drain, a charging current flowing from the charging device 60 into the secondary battery 2 is subjected to the pulse-duration modulation with a digital signal corresponding to the identification information. Since the current detecting element 61 provided in the charging device 60 as shown in FIG. 3 can detect the identification information with which the charging current is subjected to the pulse-duration modulation, the charging device 60 can read in the identification information.

While the information signal is transmitted by the pulse-duration modulation, charging efficiency is reduced because the charging current is interrupted. However, the information signal is transmitted in a short period of time, and in particular, the identification information is transmitted in a short time at the start of charging, there has little effect on the whole charging time.

Figure 5B:
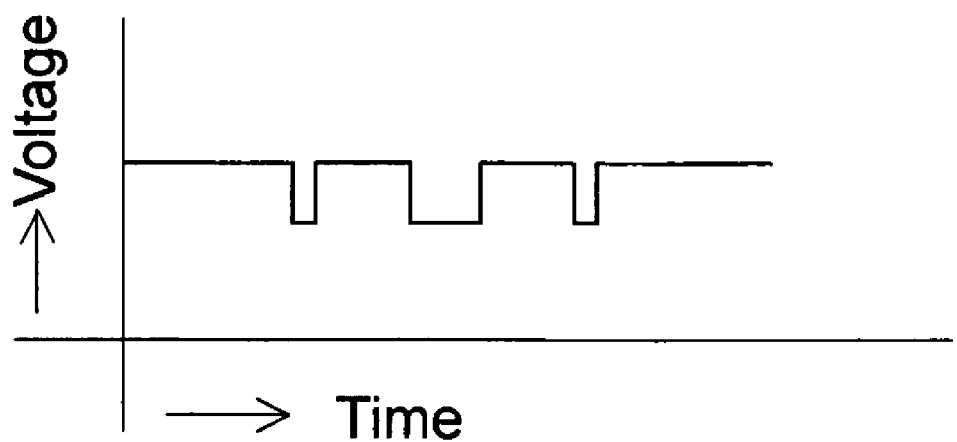
FIG. 5B is a graph showing variation in information transmission which subjects a charging and discharging current to pulse-duration modulation in the case of a loading device.

When the battery pack 50a is connected to a loading device (illustration thereof is omitted, and components for transmitting information can be identical to those of the charging device 60 and will be described with the same component names and reference numbers) to transmit an information signal by the pulse-duration modulation, if the identification information is transmitted, the control means 3 reads the identification information out of the identification information memory means 4 and inputs it into the modulation circuit 51. The modulation circuit 51 performs the pulse-duration modulation in accordance with the identification information and inputs a modulated signal into a gate of a charge FET 6a through the control means 3. The charge FET 6a, into the gate of which the pulse-duration modulated signal corresponding to the identification information is input, conducts and interrupts an electric current between its source and drain, but, as shown in FIG. 5B, a charging current is not completely interrupted because a parasitic diode p exists between the source and the drain. Thus, a voltage varies in accordance with the pulse-duration modulation so that the charging current flowing from the secondary battery 2 into the loading device is subjected to the pulse-duration modulation with a digital signal corresponding to the identification information. Since a current detecting element 61 provided in the loading device can detect the identification information with which the charging current is subjected to the pulse-duration modulation, the loading device can read in the identification information. Variation in charging voltage due to the pulse-duration modulation is small so that voltage reduction does not interfere with the operation of the loading device.

In the connection system of the battery pack as described above, the information signal is transmitted from the battery pack 1, 50, or 50a to the charging device 20 or 60 or the loading device 30 in one direction. However, if the charging device 20 or 60 or the loading device 30 is also provided with information sending means and the battery pack 1, 50, or 50a is also provided with information receiving means, information can be transmitted bidirectionally on demand. A connection system of a battery pack which is provided with bidirectional information transmission means will be hereinafter described.

Figure 6:
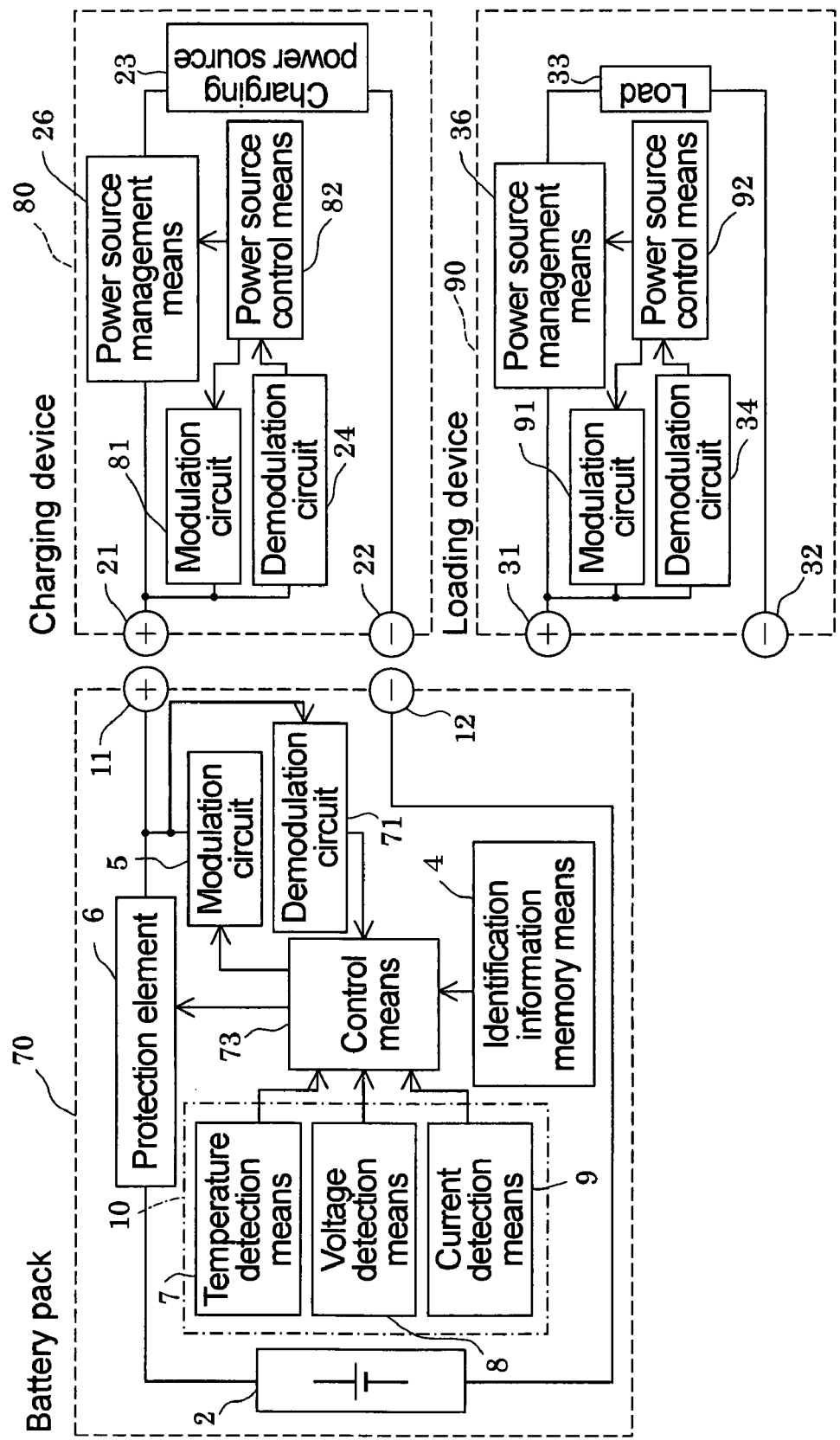
FIG. 6 is a block diagram showing the structure of a battery pack and a connection system thereof according to a third embodiment.

With reference to FIG. 6 which shows a connection system of a battery pack according to a third embodiment, wherein not only a battery pack 70 but also a charging device 80 or a loading device 90 are provided with means for sending and receiving information. The same reference numbers as the foregoing first and second embodiments denote identical components and the description thereof will be omitted.

In FIG. 6, the battery pack 70 is provided with a demodulation circuit (being information signal receiving means) 71 in addition to the modulation circuit 5, and the charging device 80 and the loading device 90 are provided with modulation circuits (being information signal sending means) 81 and 91 in addition to the demodulation circuits (being information signal receiving means) 24 and 34, respectively. When the battery pack 70 is connected to the charging device 80, power source control means 82 of the charging device 80 inputs question information such as a security code or the like to the modulation circuit 81. The modulation circuit 81 modulates a carrier wave having a predetermined frequency into a question signal with the question information by a predetermined modulation method and sends the question signal to the battery pack 70 via a positive charge terminal 21 through a direct-current power transmission line. In the battery pack 70, since the demodulation circuit 71 demodulates the question signal transmitted to a positive charge and discharge terminal 11 and the demodulated question information is input to control means 73, the control means 73 carries out a predetermined response in accordance with the contents of the question information.

When the question information is a request to identify the battery pack 70, the control means 73 reads identification information out of identification information memory means 4 and inputs it to the modulation circuit 5. The modulation circuit 5 modulates a carrier wave having a predetermined frequency with the identification information into a response signal by a predetermined modulation method and sends it to the charging device 80 via the positive charge and discharge terminal 11 through the direct-current power transmission line. In the charging device 80, the demodulation circuit 24 demodulates the sent response signal and takes out identification information, which is input to the power source control means 82. The power source control means 82 judges the correctness of the identification information. When the identification information is correct, the power source control means 82 allows power source management means 26 to supply charging energy from a charging power source 23 to the battery pack 70. When the identification information is not correct, the power source control means 82 does not allow the power source management means 26 to supply the charging energy. In a control procedure by which the charging device 80 identifies the battery pack 70, since the battery pack 70 carries out the process of responding to a question from the charging device 80, an identification level is improved and hence this control procedure is effective for identifying an imitation to which the identification information is copied and the like.

When the question information is a request for battery temperature information which is necessary for the charge control of a secondary battery 2, the control means 73 inputs the battery temperature information input from temperature detection means 7 to the modulation circuit 5. The modulation circuit 5 modulates a carrier wave having a predetermined frequency with the battery temperature information into a response signal by a predetermined modulation method and sends it to the charging device 80 via the positive charge and discharge terminal 11 through the direct-current power transmission line. In the charging device 80, since the demodulation circuit 24 demodulates the sent response signal and takes out battery temperature information which is then input to the power source control means 82, the power source control means 82 can control the voltage or current of charging energy output from the charging power source 23 in accordance with the battery temperature.

When the battery pack 70 is connected to the loading device 90, as in the case of the charging device 80, power source control means 82 of the loading device 90 inputs question information such as a security code to the modulation circuit 91. The modulation circuit 91 modulates a carrier wave having a predetermined frequency into a question signal with the required question information by a predetermined modulation method and sends the question signal to the battery pack 70 via a positive discharge terminal 31 through a direct-current power transmission line. In the battery pack 70, since the demodulation circuit 71 demodulates the transmitted question signal and the demodulated question information is input to the control means 73, the control means 73 carries out a predetermined response in accordance with the contents of the question information.

When the question information is a request to identify the battery pack 70, the control means 73 reads the identification information out of the identification information memory means 4 and inputs it to the modulation circuit 5. The modulation circuit 5 modulates a carrier wave having a predetermined frequency with the identification information into a response signal by a predetermined modulation method and sends it to the loading device 90 via the positive charge and discharge terminal 11 through the direct-current power transmission line. In the loading device 90, the demodulation circuit 34 demodulates the sent response signal and takes out identification information, which is then input to the power source control means 92. The power source control means 92 judges the correctness of the identification information. When the identification information is correct, the power source control means 92 allows power source management means 36 to permit the connection of the battery pack 70. In the control procedure by which the charging device 90 identifies the battery pack 70, since the battery pack 70 carries out the process of responding to a question from the loading device 90, identification is carried out more precisely and hence this control procedure is effective for identifying an imitation to which the identification information is copied and the like.

When the question information is a request for a remaining amount report which asks the amount of secondary battery 2 remaining, the control means 73 inputs the calculated amount of secondary battery 2 remaining to the modulation circuit 5 as remaining amount information. The modulation circuit 5 modulates a carrier wave having a predetermined frequency with the remaining amount information into a response signal by a predetermined modulation method and sends it to the loading device 90 via the positive charge and discharge terminal 11 through the direct-current power transmission line. In the loading device 90, the demodulation circuit 34 demodulates the sent response signal and takes out remaining amount information, which is then input to the power source control means 92. Therefore, when the loading device 90 is a notebook PC 40, if information about reduction in the amount of battery remaining is transmitted, the notebook PC 40 displays or alarms reduction in the amount of battery remaining to a user and hence the notebook PC 40 prompts the user to save data or to urge switching into AC power by carrying out warning operation.

In the foregoing third embodiment, the carrier wave modulated with the information is transmitted through the direct-current power transmission line to transmit information, but the charging current may be subjected to a pulse modulation with digital information to transmit the information. When the electric current is subjected to the pulse modulation with the digital information to transmit the information, similarly as in the case of subjecting the predetermined carrier wave to the predetermined modulation method to carry out communication as described above, the information can be bidirectionally transmitted between the battery pack and the charging device or the loading device. When information from the battery pack 50 is transmitted to the charging device as shown in FIG. 3, the control means 3 allows the modulation circuit 51 to modulate the switching element 52 to transmit variation in an electric current to the current detecting element 61 in the charging device 60, thereby transmitting the information through the demodulation circuit 62. The power source control means 25 controls the power source management means 26 on the basis of that information, so that the charging power source 23 can be indirectly controlled. Conversely, when information is transmitted from the charging device 60 to the battery pack 50, the power source control means 25 in the charging device 60 allows the power source management means 26 to transmit the information to the battery pack 50 as variation in the electric current. In the battery pack 50, the current detection means 9 detects the variation in the electric current and transmits the information to the control means 3. Thus, the information can be bidirectionally transmitted between the battery pack 50 and the charging device 60. In FIG. 3, only the charging device 60 is illustrated as the counterpart at the other end of the battery pack 50 to bidirectionally carry out information communication, but the loading device may be the counterpart at the other end as well. However, since electric power for operating the loading device itself is usually supplied from only the battery pack, it is preferable to modulate the charge FET for regulating charge instead of modulating the discharge FET for regulating discharge from the battery pack as described above. It is confirmed that when a modulated pulse has an efficiently high frequency and the width thereof is short to such an extent as not to be interrupted by a smoothing capacitor installed in the loading device, the induction of a malfunction of the loading device can be prevented.

INDUSTRIAL APPLICABILITY

As described above, the battery pack according to the present invention is connected to a charging device or a loading device only by two positive and negative terminals through which are essentially required for flowing a charging current or a discharging current. An information transmission line is provided through which identification information for identifying a compatible battery pack and information on a battery operating state such as battery temperature required for charge control is superimposed on the direct-current power transmission line connecting the two terminals and sent. Accordingly, the two terminals can also transmit information with resisting the influence of electromagnetic interference and electrostatic destruction though they are just for transmitting direct-current power. Simplifying the structure of the terminals makes it possible to miniaturize the battery pack, the charging device, and the loading device and reduce costs thereof and brings about advantage to miniaturizing and improving the performance of portable electronic equipment such as a cellular phone and a notebook PC.

According to the connection system of the battery pack of the present invention, only connecting a direct-current power transmission line by positive and negative terminals which are essentially required can connect the battery pack and the charging device or the loading device. This makes it possible to transmit information for identifying the type of the battery pack to be connected, information on the operating state of the battery pack, and the like through the direct-current power transmission line. Accordingly, the two terminals can also transmit information with resisting the influence of electromagnetic interference and electrostatic destruction though they are just for transmitting direct-current power. Simplifying the structure of the terminals makes it possible to miniaturize the battery pack, the charging device, and the loading device and reduce costs thereof. Furthermore, bidirectional information transmission makes it possible to issue a necessary request at necessary timing and transmit required information any time. Therefore, the connection system of the battery pack is suitable for preventing the occurrence of a failure and an accident before it happens when an imitation battery pack having a secondary battery without required performance, a battery protection circuit with insufficient performance, or the like is connected to the charging device or the loading device.

The invention claimed is:

1. A battery pack comprising a secondary battery, a positive charge and discharge terminal and a negative charge and discharge terminal which are connected to a positive electrode and a negative electrode of the secondary battery, respectively, and battery operating state detection means for detecting an operating state of the secondary battery, wherein:

the battery operating state detection means includes at least one of a temperature detection means for detecting battery temperatures, a voltage detection means for detecting a battery voltage, and a current detection means for detecting a charging and discharging current, the battery pack is provided with information signal sending means which modulates operating state detection information detected by the battery operating state detection means into an operating state detection signal, which can be transmitted to a charging device for supplying charging energy to the secondary battery by connecting it to the positive charge and discharge terminal and the negative charge and discharge terminal or a loading device which is operated by the discharging energy of the secondary battery by connecting it to the positive charge and discharge terminal and the negative charge and discharge terminal through the positive charge and discharge terminal or the negative charge and discharge terminal, and sends the operating state detection signal thereto.

2. The battery pack according to claim 1, wherein the battery pack is electrically connected to the charging device or the loading device only by positive and negative two connection terminals.

3. The battery pack according to claim 1, wherein the information signal sending means is configured to send the identification signal or the operating state detection signal, into which a carrier wave having a predetermined frequency is modulated with the identification information or the operating state detection information by a predetermined modulation method, through the positive charge and discharge terminal or the negative charge and discharge terminal.

4. The battery pack according to claim 1, wherein the information signal sending means is configured to subject a charging or discharging current flowing through the positive charge and discharge terminal or the negative charge and discharge terminal to a pulse modulation with the identification information or the operating state detection information.

5. A battery pack comprising a secondary battery, a positive charge and discharge terminal and a negative charge and discharge terminal which are connected to a positive electrode and a negative electrode of the secondary battery, respectively, and battery operating state detection means for detecting the operating state of the secondary battery, wherein:
the battery operating state detection means includes at least one of a temperature detection means for detecting battery temperatures, a voltage detection means for detecting a battery voltage, and a current detection means for detecting a charging and discharging current, and
the battery pack is provided with identification information memory means which stores identification information and information signal sending means which modulates the identification information read out of the identification information memory means or operating state detection information detected by the operating state detection means into an information signal, which can be transmitted to a charging device for supplying charging energy to the secondary battery by connecting it to the positive charge and discharge terminal and the negative charge and discharge terminal or a loading device which is operated by the discharging energy of the secondary battery by connecting it to the positive charge and discharge terminal and the negative charge and discharge terminal through the positive charge and discharge terminal or the negative charge and discharge terminal, and sends the information signal thereto.

6. A battery pack comprising a secondary battery, a positive charge and discharge terminal and a negative charge and discharge terminal which are connected to a positive electrode and a negative electrode of the secondary battery, respectively, and battery operating state detection means for detecting the operating state of the secondary battery, wherein:
the battery operating state detection means includes at least one of a temperature detection means for detecting battery temperatures, a voltage detection means for detecting a battery voltage, and a current detection means for detecting a charging and discharging current, and
the battery pack is provided with identification information memory means which stores identification information, information signal receiving means which demodulates a question signal transmitted from a charging device or a loading device through the positive charge and discharge terminal or the negative charge and discharge terminal to take out question information, and information signal sending means which modulates the identification information read out of the identification information memory means or operating state detection information detected by the operating state detection means into an information signal, which can be transmitted to the charging device for supplying charging energy to the secondary battery by connecting it to the positive charge and discharge terminal and the negative charge and discharge terminal or the loading device which is operated by the discharging energy of the secondary battery by connecting it to the positive charge and discharge terminal and the negative charge and discharge terminal through the positive charge and discharge terminal or the negative charge and discharge terminal, in response to a request described in the question information and sends the information signal thereto.

7. A connection system of a battery pack, for connecting a battery pack which includes a secondary battery, a positive charge and discharge terminal and a negative charge and discharge terminal which are connected to a positive electrode and a negative electrode of the secondary battery, respectively, and battery operating state detection means for detecting an operating state of the secondary battery, to a charging device for supplying charging energy to the secondary battery by connecting it to the positive charge and discharge terminal and the negative charge and discharge terminal or to a loading device which is operated by the discharging energy of the secondary battery by connecting it to the positive charge and discharge terminal and the negative charge and discharge terminal, wherein:
the battery operating state detection means includes at least one of a temperature detection means for detecting battery temperatures, a voltage detection means for detecting a battery voltage, and a current detection means for detecting a charging and discharging current, and
the battery pack is provided with information signal sending means which modulates operating state detection information detected by the battery operating state detection means into an operating state detection signal, which can be transmitted to the charging device or the loading device by connecting it to the positive charge and discharge terminal or the negative charge and discharge terminal through the positive charge and discharge terminal or the negative charge and discharge terminal, and sends the operating state detection signal thereto, and the charging device or the loading device is provided with information signal receiving means which demodulates the information signal transmitted through the positive charge and discharge terminal or the negative charge and discharge terminal and read out the operating state detection information and power source control means which controls an output of charging energy from the charging device or an input of discharging energy into the loading device on the basis of the read out operating state detection information.

8. The connection system of a battery pack according to claim 7, wherein the information signal sending means is configured to send the identification signal, the operating state detection signal, or the question signal, into which a carrier wave having a predetermined frequency is modulated with the identification information, the operating state detection information, or the question information by a predetermined modulation method, through the direct-current power transmission line.

9. The connection system of a battery pack according to claim 7, wherein the information signal sending means is configured to subject a charging or discharging current flowing through the direct-current power transmission line to a pulse modulation with the identification information, the operating state detection information, or the question information.

10. The connection system of a battery pack according to claim 7, wherein the information signal receiving means is configured to demodulate the identification signal, the operating state detection signal, or the question signal transmitted through the direct-current power transmission line by a predetermined demodulation method and to take out the identification information, the operating state detection information, or the question information.

11. The connection system of a battery pack according to claim 7, wherein the information signal receiving means is configured to take out variation of a current in the pulse-modulated charging or discharging current flowing through the direct-current power transmission line for demodulation.

12. A connection system of a battery pack, for connecting a battery pack which includes a secondary battery, a positive charge and discharge terminal and a negative charge and discharge terminal which are connected to a positive electrode and a negative electrode of the secondary battery, respectively, and battery operating state detection means for detecting the operating state of the secondary battery, to a charging device for supplying charging energy to the secondary battery by connecting it to the positive charge and discharge terminal and the negative charge and discharge terminal or to a loading device which is operated by the discharging energy of the secondary battery by connecting it to the positive charge and discharge terminal and the negative charge and discharge terminal, wherein:

the battery operating state detection means includes at least one of a temperature detection means for detecting battery temperatures, a voltage detection means for detecting a battery voltage, and a current detection means for detecting a charging and discharging current, and the battery pack is provided with identification information memory means which stores identification information and information signal sending means which modulates the identification information read out of the identification information memory means or operating state detection information detected by the battery operating state detection means into an information signal, which can be transmitted to the charging device or the loading device through the positive charge and discharge terminal or the negative charge and discharge terminal, and sends the information signal thereto, and the charging device or the loading device is provided with information signal receiving means which demodulates the information signal transmitted through the positive charge and discharge terminal or the negative charge and discharge terminal and read out the identification information or the operating state detection information and power source control means which controls an output of charging energy from the charging device or an input of discharging energy into the loading device on the basis of the read out identification information or operating state detection information.

13. A connection system of a battery pack, for connecting the battery pack which includes a secondary battery, a positive charge and discharge terminal and a negative charge and discharge terminal which are connected to a positive electrode and a negative electrode of the secondary battery, respectively, and battery operating state detection means for detecting the operating state of the secondary battery, to a charging device for supplying charging energy to the secondary battery by connecting it to the positive charge and discharge terminal and the negative charge and discharge terminal or to a loading device which is operated by the discharging energy of the secondary battery by connecting it to the positive charge and discharge terminal and the negative charge and discharge terminal, wherein:

the battery operating state detection means includes at least one of a temperature detection means for detecting battery temperatures, a voltage detection means for detecting a battery voltage, and a current detection means for detecting a charging and discharging current, and the battery pack is provided with identification information memory means which stores identification information, information signal receiving means which demodulates a question signal transmitted from the charging device or the loading device through the positive charge and discharge terminal or the negative charge and discharge terminal to take out question information, and information signal sending means which modulates the identification information read out of the identification information memory means or operating state detection information detected by the battery operating state detection means into a response signal in response to a request described in the question information and sends the response signal through the positive charge and discharge terminal or the negative charge and discharge terminal, and the charging device or the loading device is provided with information signal sending means which modulates the question information into a question signal which can be transmitted through the positive charge and discharge terminal or the negative charge and discharge terminal and sends the question signal to the connected battery pack, information signal receiving means which demodulates the response signal transmitted from the battery pack through the positive charge and discharge terminal or the negative charge and discharge terminal and read out the identification information or the operating state detection information, and power source control means which decodes the read out identification information or the operating state detection information and controls an output of charging energy from the charging device or an input of discharging energy into the loading device.

* * * * *